(12) United States Patent
Waltermann et al.

(10) Patent No.: US 9,366,543 B1
(45) Date of Patent: Jun. 14, 2016

(54) INTELLIGENT NAVIGATION INSTRUCTION GENERATOR

(71) Applicant: Lenovo (Singapore) Pte. Ltd., Singapore (SG)

(72) Inventors: Rod D Waltermann, Rougemont, NC (US); Nathan J. Peterson, Durham, NC (US); Russell Speight VanBlon, Raleigh, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/561,529

(22) Filed: Dec. 5, 2014

(51) Int. Cl.
*G06F 7/00* (2006.01)
*G01C 21/34* (2006.01)
*G01C 21/36* (2006.01)

(52) U.S. Cl.
CPC ........ *G01C 21/3484* (2013.01); *G01C 21/3641* (2013.01); *G01C 21/3691* (2013.01)

(58) Field of Classification Search
CPC .............. G01C 21/3453; G01C 21/00; G01C 21/3611; G01C 21/26; G01C 21/36
USPC ................. 701/410, 424, 431, 465, 771, 417; 340/990, 995.16
See application file for complete search history.

(56) References Cited

U.S. PATENT DOCUMENTS

| | | | | |
|---|---|---|---|---|
| 5,802,492 A * | 9/1998 | DeLorme | ........... | G01C 21/3476 340/990 |
| 5,948,040 A * | 9/1999 | DeLorme | ............... | G01C 21/36 340/990 |
| 6,321,158 B1 * | 11/2001 | DeLorme | ............... | G01C 21/26 340/995.16 |
| 7,525,484 B2 * | 4/2009 | Dupray | ................... | G01S 1/026 342/450 |
| 2006/0095204 A1 * | 5/2006 | Kim | .................... | G01C 21/3629 701/431 |
| 2006/0142940 A1 * | 6/2006 | Choi | ...................... | G01C 21/26 701/417 |
| 2011/0131243 A1 * | 6/2011 | Aben | ................. | G01C 21/3611 707/771 |
| 2014/0278070 A1 * | 9/2014 | McGavran | ............. | G01C 21/00 701/465 |
| 2015/0219468 A1 * | 8/2015 | Ziezold | .............. | G01C 21/3453 701/410 |

OTHER PUBLICATIONS

Ramachandran, Deepak, et al., "Driver Familiarity Modeling for Generating Navigation Directions", IEEE Conference on Intelligent Transportation Systems 2013 (http://ieee-itsc13.org/), held in The Hague (Netherlands) Oct. 6-9, 2103, 8 pgs.

\* cited by examiner

*Primary Examiner* — McDieunel Marc
(74) *Attorney, Agent, or Firm* — Schwegman, Lundberg & Woessner, P.A.

(57) ABSTRACT

A method includes obtaining a current location and a destination at a user navigation system, obtaining prior route information corresponding to routes taken by the user, generating directions for communication to the user to aid in navigation from the current location to the destination, wherein the directions are modified based on the prior route information to reduce a granularity of the directions, receiving additional information regarding a route between the current location and the destination, and further modifying the modified generated directions based on the received additional information.

20 Claims, 3 Drawing Sheets

INTELLIGENT NAVIGATION INSTRUCTION GENERATOR

BACKGROUND

Many navigation systems provide navigation instructions to aid user in traveling to a destination. Navigation systems may integrate global position information to provide detailed instructions to users advising users where to turn to follow a route. Some navigation systems also adapt directions it provides where the system has information indicating the user is familiar with a route based on prior GPS traces of routes the user has previously taken.

SUMMARY

A method includes obtaining a current location and a destination at a user navigation system, obtaining prior route information corresponding to routes taken by the user, generating directions for communication to the user to aid in navigation from the current location to the destination, wherein the directions are modified based on the prior route information to reduce a granularity of the directions, receiving additional information regarding a route between the current location and the destination, and further modifying the modified generated directions based on the received additional information.

A machine readable storage device has instructions for execution by a processor of a machine. The instructions cause the processor to perform obtaining a current location and a destination at a user navigation system, obtaining prior route information corresponding to routes taken by the user, generating directions for communication to the user to aid in navigation from the current location to the destination, wherein the directions are modified based on the prior route information to reduce a granularity of the directions, receiving additional information regarding a route between the current location and the destination, and further modifying the modified generated directions based on the received additional information.

A device includes a processor, a global positioning device coupled to the processor to receive global positioning signals, a transceiver coupled to the processor to receive wireless signals, and a memory device having a program stored thereon for execution by the processor to obtain a current location and a destination at a user navigation system, obtain prior route information corresponding to routes taken by the user, generate directions for communication to the user to aid in navigation from the current location to the destination, wherein the directions are modified based on the prior route information to reduce a granularity of the directions, receive additional information regarding a route between the current location and the destination, and further modify the modified generated directions based on the received additional information.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
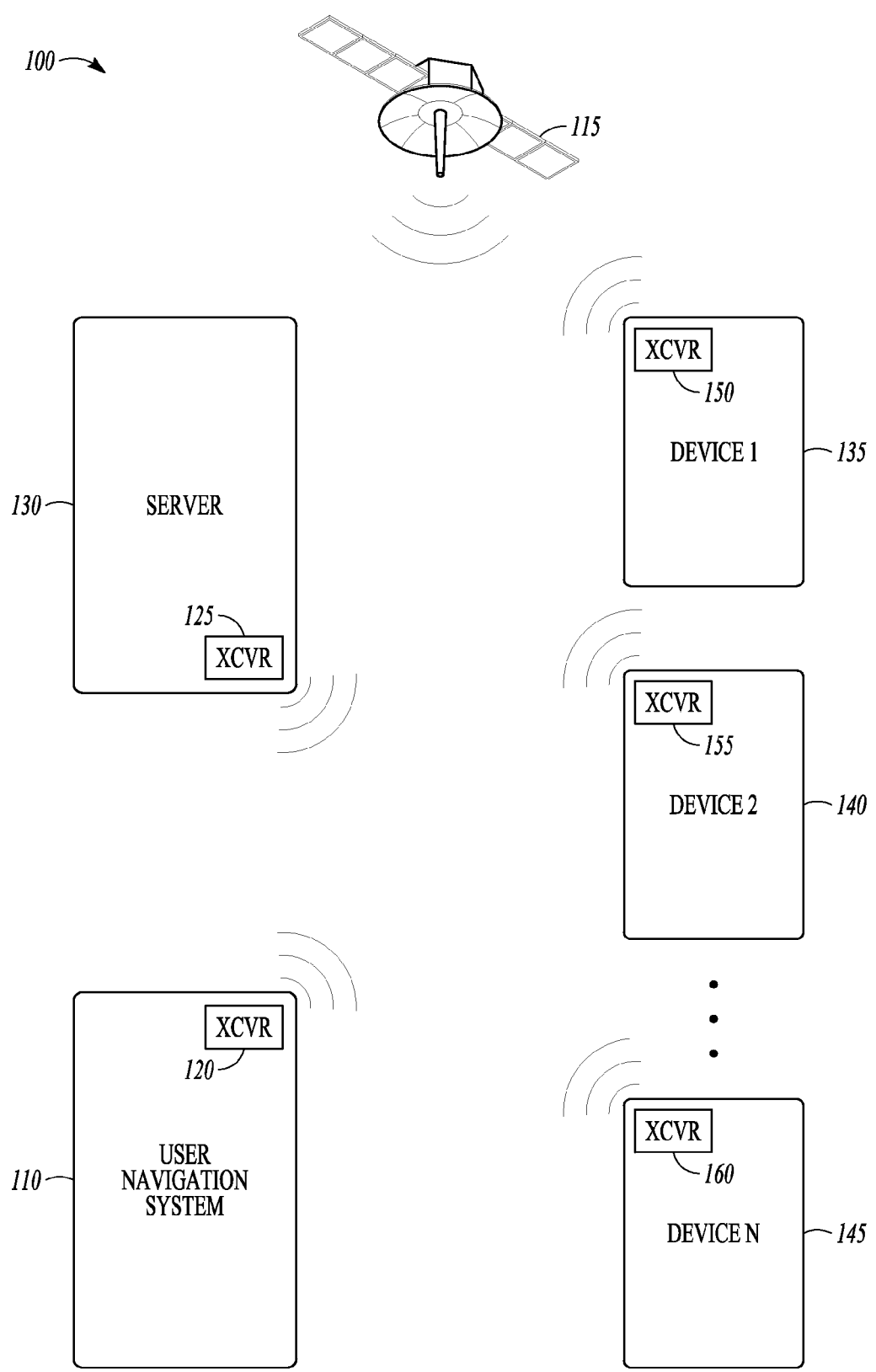
FIG. 1 is block diagram of a navigation system and network according to an example embodiment.

FIG. 1 is a block diagram of a system 100 for providing navigation instructions. A user navigation system 110 receives signals from the global positioning system (GPS) satellite 115, and uses the signals to determine a current location of the user navigation system 110. In one embodiment, the user navigation system 110 is a mobile device having a transceiver 120 to communicate with a transceiver 125 of a server 130. The transceivers may be cellular telephone transceivers in one embodiment capable of voice and data reception and transmission. In further embodiments, the transceivers may be network adapters to couple the devices to a wireless or wired network for transmission of data and optional data reception. Server 130 may be a computer system or private branch exchange system in various embodiments, capable of executing code to perform operations.

Server 130 may be coupled to further devices indicated at 135, 140, and 145 via respective transceivers 150, 155, and 160. The further devices may include cameras, smart phones, and other devices capable of providing information regarding one or more routes for use by the user navigation system 110 to determine and provide directions for navigation between the current location and a specified destination. For instance, other users using the further devices may provide real time information such as traffic conditions, locations of speed traps, road repairs, weather, and other information for use in determining a route. The further devices may also include traffic cameras and other networked sensors capable of communicating information to the user navigation system 110.

Other information regarding the route may be received via back channels of radio stations, referred to as a traffic message channel that delivers traffic and travel information to motor vehicle drivers. Such messages may be digitally coded and transmitted via conventional FM radio broadcasts or via digital audio broadcasting or via satellite radio. Dynamic information may be provided without interruption of audio broadcasts.

In some embodiment, route and direction information may be generated by the user navigation system 110 itself, or via the server 130 utilizing both information provided by the further devices and the user navigation system 110.

Figure 2:
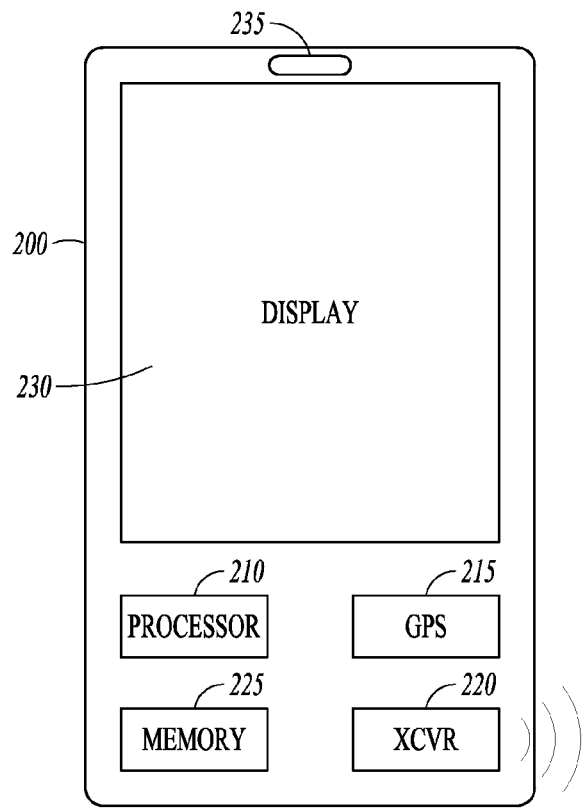
FIG. 2 is a block diagram of a navigation device according to an example embodiment.

FIG. 2 is a block diagram of a user navigation system 200 for use in providing navigation instructions to a user. In one embodiment, system 200 includes a processor 210 and a GPS device 215 coupled to the processor to receive global positioning signals and provide location information to the processor. A transceiver 220 is also coupled to the processor to send and receive wireless signals and otherwise provide a network connection for voice and data. A memory device 225 may have a program stored thereon for execution by the processor to obtain a current location from the GPS device and a destination from a user via voice or other input method. The program may be further executed to cause the processor 210 to obtain prior route information corresponding to routes taken by the user. Such prior route information may be generated and stored as a result of actual trips taken by a user, either guided via the navigation system, or even derived from unguided trips by the user.

The processor 210 may then generate directions for communication to the user via an output device such as a display 230, speaker 235, wired or wireless headset, or other information communicating device or combination of devices to aid in navigation from the current location to the destination. The directions may be modified by the processor 210 based on the prior route information to reduce a granularity of the directions provided audibly or otherwise to the user. In some embodiments, the system 200 may receive additional information from devices along the route between the current location and the destination. The directions may be further modified based on the received additional information to change the route and alternatively increase or decrease the granularity of the granularity of directions provided.

In one embodiment, the additional information comprises social feedback from users of other devices. The additional information may include information from another user regarding traffic congestion along a route between the current location and the destination or information regarding traffic congestion along an alternative route between the current location and the destination.

Processor 210 may also execute the program to perform selecting between the route and the alternative route based on the additional information, and may determine a route as a function of the prior route information such that a user preferred route is used to generate the directions.

Figure 3:
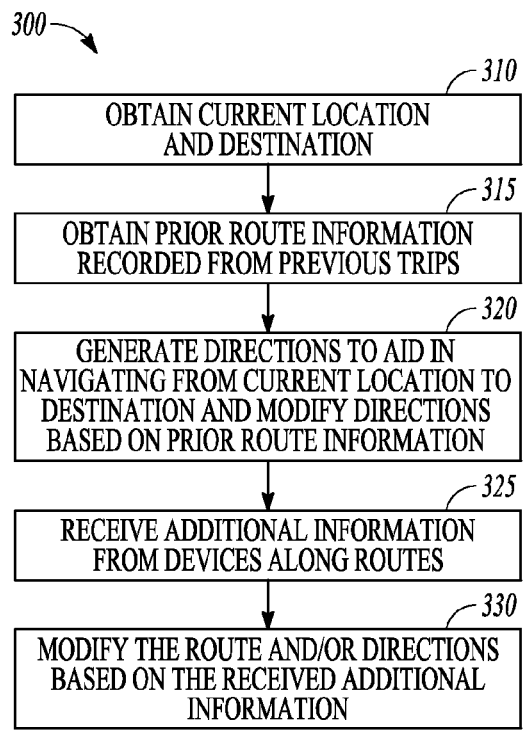
FIG. 3 is a flowchart illustrating a method of generating navigation directions according to an example embodiment.

FIG. 3 is a flowchart illustrating a method 300 of providing navigation instructions to a user. At 310, the method begins by obtaining a current location and a destination at a user navigation system. At 315, prior route information corresponding to routes taken by the user is obtained. The prior route information may be recorded as a user takes different routes, noting the locations and destinations, dates, time of day, and other information that may be relevant in determining a route preferred by a user. For instance, a user may take one route in the morning to avoid traffic, and a different route to the same destination at a different time of day. Intermediate stops may also be noted and used to determine the route. Perhaps a user grabs coffee from a drive through when travelling to a destination in the morning, but not during other times of day.

At 320, directions are generated for communication to the user to aid in navigation from the current location to the destination, wherein the directions are modified based on the prior route information to reduce a granularity of the directions. Additional information may be received at 325 from devices along one or more routes between the current location and the destination. At 330, method 300 further modifies the modified generated directions based on the received additional information.

In one embodiment, the additional information may include social feedback from other users of the devices. The social feedback may take the form of text, voice, pictures, or combinations thereof that may be recognized by the navigation system and used to modify the directions.

In one embodiment, the additional information comprises information from another user regarding traffic congestion along a route between the current location and the destination. Codes may be used, such as a number on a scale of one to five, with five being the worst. The other user may simply use their voice to indicate that traffic is really bad, with that utterance being translated to be understood by the navigation system that traffic is bad at the location where the social feedback originated. The navigation system may use that information to change the route and corresponding directions. The change may be based on a known preference of the user to avoid bad traffic, or based on a recalculated travel time being less than that calculated for the current route with the bad traffic taken into account. To base the change in route on a known user preference, an expert system, such as a neural network approach may be taken, using information associated with prior route choices to train the system. The information may include time of day of previous choices of the user to determine whether a delay would be acceptable to the user at the current time. For example, a user may tolerate less delay in the morning and more delay in the evening in exchange for a more preferred travel experience.

In a further embodiment, the additional information includes information from another user regarding traffic congestion along an alternative route between the current location and the destination. The method 300 may further select at 330 between the route and the alternative route based on the additional information.

In still a further embodiment, generating directions at 320 may include determining a route as a function of the prior route information such that a user preferred route is used to generate the directions. The preferred route may be associated with a user preference for making a right turn instead of a left turn required by a shorter route, avoiding road construction occurring on a shorter route, or the preferred route may be associated with a user preference for speed of travel, or even feeling safer. The directions associated with the original route may then be discontinued as the user preferences are learned, and new directions provided. The new directions may also be modified based on the user familiarity with the location.

Figure 4:
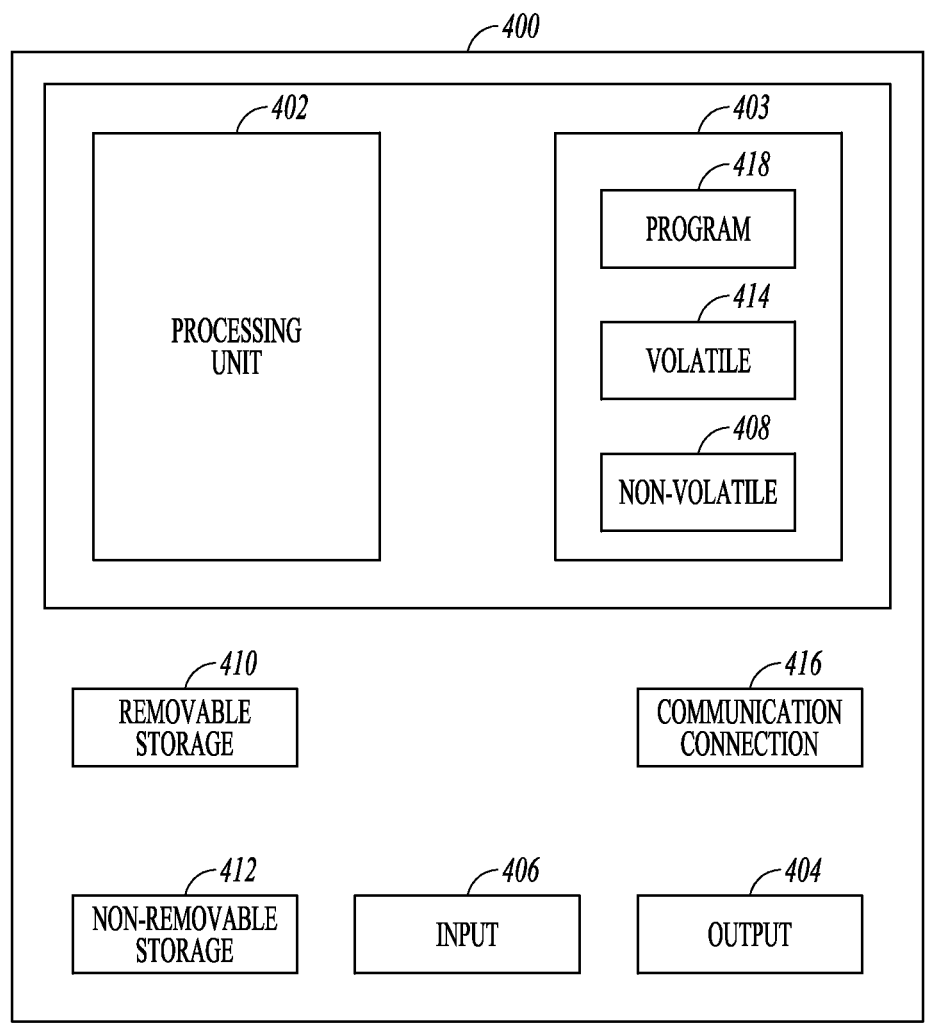
FIG. 4 is a block diagram of processing circuitry to implement methods according to example embodiments.

FIG. 4 is a block schematic diagram of a computer system 400 to implement methods according to example embodiments. All components need not be used in various embodiments. One example computing device in the form of a computer 400 (e.g., a personal computer, workstation, smart phone, tablet, mobile device, or server), may include a processing unit 402, memory 403, removable storage 410, and non-removable storage 412.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input 406, output 404, and a communication connection 416. Output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 402 of the computer 400. A hard drive, CD-ROM, and RAM are some examples of articles including a non-transitory computer-readable medium such as a storage device. The terms computer-readable medium and storage device do not include carrier waves. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

EXAMPLES

1. A method comprising:
obtaining a current location and a destination at a user navigation system;
obtaining prior route information corresponding to routes taken by the user;
generating directions for communication to the user to aid in navigation from the current location to the destination, wherein the directions are modified based on the prior route information to reduce a granularity of the directions;
receiving additional information regarding a route between the current location and the destination; and
further modifying the modified generated directions based on the received additional information.

2. The method of example 1 wherein the additional information comprises social feedback from other user's devices.

3. The method of example 2 wherein the additional information comprises information regarding traffic congestion along a route between the current location and the destination.

4. The method of example 3 wherein the additional information comprises information from another user device regarding traffic congestion along an alternative route between the current location and the destination.

5. The method of example 4 and further comprising selecting between the route and the alternative route based on the additional information.

6. The method of any of examples 1-5 wherein generating directions comprises determining a route as a function of the prior route information such that a user preferred route is used to generate the directions.

7. The method of example 6 wherein the preferred route is associated with a user preference for making a right turn instead of a left turn required by a shorter route.

8. The method of any of examples 6-7 wherein the preferred route is associated with a user preference for avoiding road construction occurring on a shorter route.

9. The method of any of examples 6-8 wherein the preferred route is associated with a user preference for speed of travel.

10. A machine readable storage device having instructions for execution by a processor of a machine, the instructions comprising instructions to perform:
obtaining a current location and a destination at a user navigation system;
obtaining prior route information corresponding to routes taken by the user;
generating directions for communication to the user to aid in navigation from the current location to the destination, wherein the directions are modified based on the prior route information to reduce a granularity of the directions;
receiving additional information regarding a route between the current location and the destination; and
further modifying the modified generated directions based on the received additional information.

11. The machine readable storage device of example 10 wherein the additional information comprises social feedback from other user's devices.

12. The machine readable storage device of example 11 wherein the additional information comprises information regarding traffic congestion along a route between the current location and the destination.

13. The machine readable storage device of example 12 wherein the additional information comprises information from another user device regarding traffic congestion along an alternative route between the current location and the destination.

14. The machine readable storage device of example 13 and wherein the instructions further comprise instructions to perform selecting between the route and the alternative route based on the additional information.

15. The machine readable storage device of any of examples 10-14 wherein generating directions comprises determining a route as a function of the prior route information such that a user preferred route is used to generate the directions.

16. A device comprising:
a processor;
a global positioning device coupled to the processor to receive global positioning signals;
a transceiver coupled to the processor to receive wireless signals; and
a memory device having a program stored thereon for execution by the processor to:
obtain a current location and a destination at a user navigation system;
obtain prior route information corresponding to routes taken by the user;
generate directions for communication to the user to aid in navigation from the current location to the destination, wherein the directions are modified based on the prior route information to reduce a granularity of the directions;
receive additional information regarding a route between the current location and the destination; and further modify the modified generated directions based on the received additional information.

17. The device of example 16 wherein the additional information comprises social feedback from other user's devices.

18. The device of example 17 wherein the additional information comprises information regarding traffic congestion along a route between the current location and the destination.

19. The device of example 18 wherein the additional information comprises information from another user device received via the transceiver, regarding traffic congestion along an alternative route between the current location and the destination.

20. The device of any of examples 15-19 and wherein the processor further executes the program to perform selecting between the route and the alternative route based on the additional information, and wherein generating directions comprises determining a route as a function of the prior route information such that a user preferred route is used to generate the directions.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   obtaining a current location and a destination at a user navigation system;
   obtaining prior route information corresponding to routes taken by the user;
   generating directions corresponding to a prior route for communication to the user to aid in navigation from the current location to the destination, wherein the directions corresponding to the prior route are modified based on the prior route information and user familiarity with the prior route to reduce a granularity of the directions;
   receiving additional information regarding a route between the current location and the destination; and
   further modifying the modified generated directions based on the received additional information.

2. The method of claim 1 wherein the additional information comprises social feedback from other user's devices.

3. The method of claim 2 wherein the additional information comprises information regarding traffic congestion along the prior route between the current location and the destination.

4. The method of claim 3 wherein the additional information comprises information from another user device regarding traffic congestion along an alternative route between the current location and the destination.

5. The method of claim 4 and further comprising selecting between the route and the alternative route based on the additional information.

6. The method of claim 1 wherein generating directions comprises determining a route as a function of the prior route information such that a user preferred route is used to generate the directions.

7. The method of claim 6 wherein the preferred route is associated with a user preference for making a right turn instead of a left turn required by a shorter route.

8. The method of claim 6 wherein the preferred route is associated with a user preference for avoiding road construction occurring on a shorter route.

9. The method of claim 6 wherein the preferred route is associated with a user preference for speed of travel.

10. A machine readable storage device having instructions for execution by a processor of a machine, the instructions comprising instructions to perform:
    obtaining a current location and a destination at a user navigation system;
    obtaining prior route information corresponding to routes taken by the user;
    generating directions corresponding to a prior route for communication to the user to aid in navigation from the current location to the destination, wherein the directions corresponding to the prior route are modified based on the prior route information and user familiarity with the prior route to reduce a granularity of the directions;
    receiving additional information regarding a route between the current location and the destination; and
    further modifying the modified generated directions based on the received additional information.

11. The machine readable storage device of claim 10 wherein the additional information comprises social feedback from other user's devices.

12. The machine readable storage device of claim 11 wherein the additional information comprises information regarding traffic congestion along a route between the current location and the destination.

13. The machine readable storage device of claim 12 wherein the additional information comprises information from another user device regarding traffic congestion along an alternative route between the current location and the destination.

14. The machine readable storage device of claim 13 and wherein the instructions further comprise instructions to perform selecting between the route and the alternative route based on the additional information.

15. The machine readable storage device of claim 10 wherein generating directions comprises determining a route as a function of the prior route information such that a user preferred route is used to generate the directions.

16. A device comprising:
    a processor;
    a global positioning device coupled to the processor to receive global positioning signals;
    a transceiver coupled to the processor to receive wireless signals; and
    a memory device having a program stored thereon for execution by the processor to:
    obtain a current location and a destination at a user navigation system;
    obtain prior route information corresponding to routes taken by the user;
    generate directions corresponding to a prior route for communication to the user to aid in navigation from the current location to the destination, wherein the directions corresponding to the prior route are modified based on the prior route information and user familiarity with the prior route to reduce a granularity of the directions;
    receive additional information regarding a route between the current location and the destination; and
    further modify the modified generated directions based on the received additional information.

17. The device of claim 16 wherein the additional information comprises social feedback from other user's devices.

18. The device of claim 17 wherein the additional information comprises information regarding traffic congestion along a route between the current location and the destination.

19. The device of claim 18 wherein the additional information comprises information from another user device received via the transceiver, regarding traffic congestion along an alternative route between the current location and the destination.

20. The device of claim 15 and wherein the processor further executes the program to perform selecting between the route and the alternative route based on the additional information, and wherein generating directions comprises determining a route as a function of the prior route information such that a user preferred route is used to generate the directions.

* * * * *